T. F. Freeman.
Cutting Gears.
N° 70,192.   Patented Oct. 29, 1867.

Witnesses
Chas. H. Smith
Geo. S. Pinckney

Inventor,
Thomas F. Freeman

United States Patent Office.

THOMAS F. FREEMAN, OF BROOKLYN, NEW YORK, ASSIGNOR TO HIMSELF AND WILLIAM H. ABBOT, OF THE SAME PLACE.

Letters Patent No. 70,192, dated October 29, 1867.

IMPROVEMENT IN MACHINES FOR CUTTING WOOD-GEAR.

The Schedule referred to in these Letters Patent and making part of the same.

TO ALL WHOM IT MAY CONCERN:

Be it known that I, THOMAS F. FREEMAN, of Brooklyn, in the county of Kings, and State of New York, have invented, made, and applied to use a certain new and useful Improvement in Gear-Cutting Machinery; and I do hereby declare the following to be a full, clear, and exact description of the same, reference being had to the annexed drawing, making part of this specification, wherein—

Figure 1:
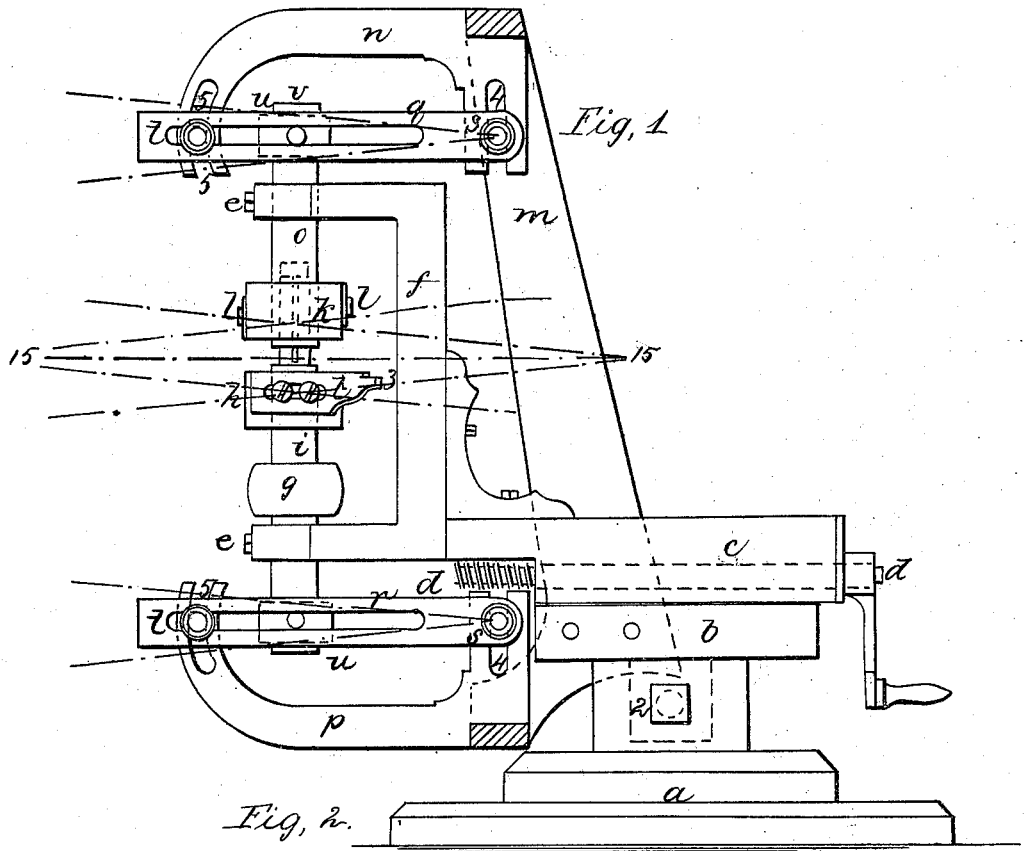
Figure 2:
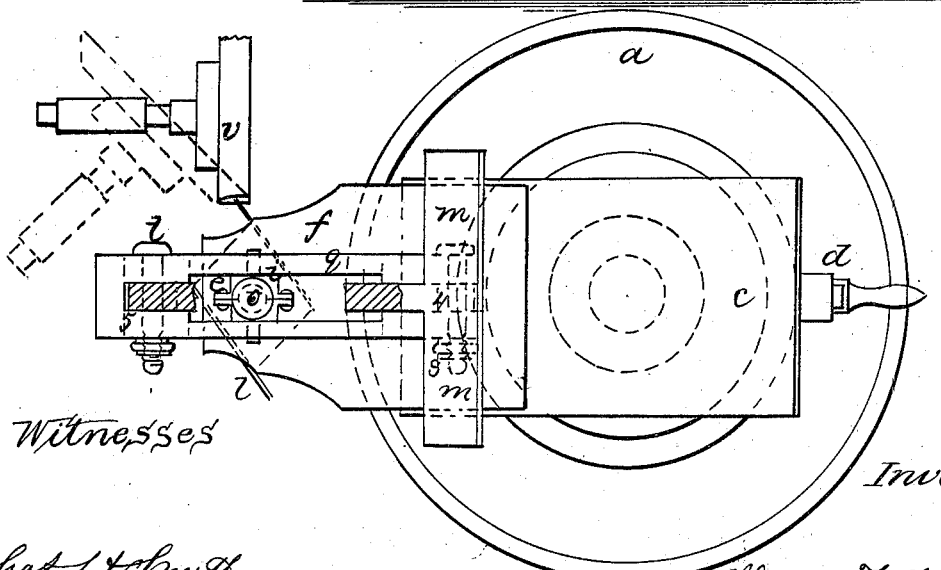

Figure 1 is an elevation of my said machine, the frame on one side being removed to show the other parts; and Figure 2 is a plan, with parts of the top arm removed to show the vertical spindle.

Similar marks of reference denote the same parts.

The object of my invention is to furnish means for cutting out the spaces between the teeth of gear-wheels, leaving the said teeth of the proper shape and finish. My machine is capable of cutting parallel or tapering teeth for mitre, bevel, or straight gears, and is specially adapted to cutting the wooden patterns from which castings are to be made, or for cutting the wooden teeth of mill-gearing.

My invention consists in a pair of revolving cutters set upon the same axis of rotation, but capable of being moved apart, in combination with adjustable guides or slides that determine the path through which the cutters move in forming the surfaces of the teeth; hence said teeth can be formed with a wider or narrower opening, and with either parallel or tapering sides.

In the drawing, $a$ is a base-block, fitted to be attached to the bed of a lathe or other suitable support. $b$ is a bed-piece upon a central stud in $a$, so that the bed can be turned around thereon horizontally, and secured by a screw, 2. Upon the bed-piece $b$ is the slide $c$, actuated by a screw, $d$, like the slide-rest of a lathe. $f$ is a frame or yoke on $c$, with boxes $e\ e$, carrying the spindles $i$ and $o$. These are fitted to slide endwise, as well as to revolve in the boxes $e\ e$. The spindle $o$ is made hollow, to receive the spindle $i$, and a feather causes the two to revolve together, but allows the spindle $i$ to move endwise in the hollow spindle $o$. The spindle $i$ is provided with a pulley, $g$, to which a driving-belt is applied, and $h$ is a stock on $i$, and $k$ a stock on $o$, to which are attached cutters $l$, of the shape required for the sides of the teeth of the gear-wheels. I form these cutters $l$ with a narrow projecting point, 3, for cutting teeth in wood, in order that the wood may not be split at the finishing end of the tooth, said projecting end 3 acting like a saw-tooth to open the kerf in advance of the cutter that shapes the side of the tooth. This in some widths of teeth may leave a piece of the wood projecting in the bottom of the space between the teeth, that has to be removed subsequently by hand or by another cutter. The bed-piece $b$ is fitted with side frames $m$, with cross-pieces above and below, that carry the slotted arms $n$ and $p$, receiving the guide-slides $q$ and $r$. $s\ s$ are bolts at the inner ends of the slides $q\ r$, entering the slots 4 in the arms $n$ and $p$, and $t\ t$ are bolts at the outer ends of the slides $q\ r$, entering the slots 5 in the ends of the arms $n$ and $p$. By means of these bolts $s$ and $t$ the said slides $q$ and $r$ can be secured at any point to which they may be placed, either parallel to each other or at an inclination in one direction or the other, and so as to sustain the cutters at any desired distance apart by the boxes $u\ u$, that take neck-shaped journals at the ends of the spindles $i$ and $o$, and have trunnion ends that enter the slots in the sides of the slides $q$ and $r$.

The red lines in fig. 1 illustrate how the slides $q\ r$ can be set at an inclination in order that the lines in which the cutters operate shall converge to a point so as to cut a bevel or mitre gear. The wheel to be cut is to be mounted on a face-plate, chuck, or other axial support, so that it can be turned around progressively, and the level of the centre of the said wheel is to correspond with that of the line 15, and the wheel is either to stand at right angles to the motion of the cutters, given by the movement of the bed-slide C, as seen at $v$, or it may stand at any inclination thereto, as illustrated by the red line in fig. 2. The axis $x$ of the wheel to be cut being in the same horizontal plane as the line 15, the whole of the gear-cutting apparatus is to be adjusted to stand in the correct position to that axis, the same being supported upon and attached to a suitable bed, or else the axis on which the wheel is sustained may be moved horizontally, to accommodate the position of the cutting apparatus, as may be necessary, according to the size of wheel or the bevel or inclination of the teeth. It will now be understood that the slides $q$ and $r$ remain stationary after they are adjusted, and that the cutters $k$ and

*l*, as they revolve, are brought into contact with the wheel *v* to be cut; that as the cutting progresses the cutters may remain the same distance apart, or be moved nearer together or further apart by the action of the slides *q* and *r*, so that the line in which the cutters operate may converge, diverge, or remain parallel, according to the bevel, mitre, or straight gear-wheel that is being cut. The dotted red lines in fig. 1 illustrate the path in which the revolving cutters operate while being moved along to perform the desired work.

What I claim, and desire to secure by Letters Patent, is—

1. A pair of revolving cutters, set upon the same axis of rotation, but capable of being moved towards or away from each other, in combination with guides or slides, substantially as specified, for directing the cutters in forming gear-teeth, as set forth.

2. I claim the arrangement of the slides *q r*, arms *n p*, frame *m*, slide *c*, and bed *b*, in combination with the rotary cutters *l l*, mounted and actuated as set forth.

In witness whereof I have hereunto set my signature this thirtieth day of April, A. D. 1867.

THOMAS F. FREEMAN.

Witnesses:
   CHAS. H. SMITH,
   GEO. T. PINCKNEY.